Patented July 27, 1943

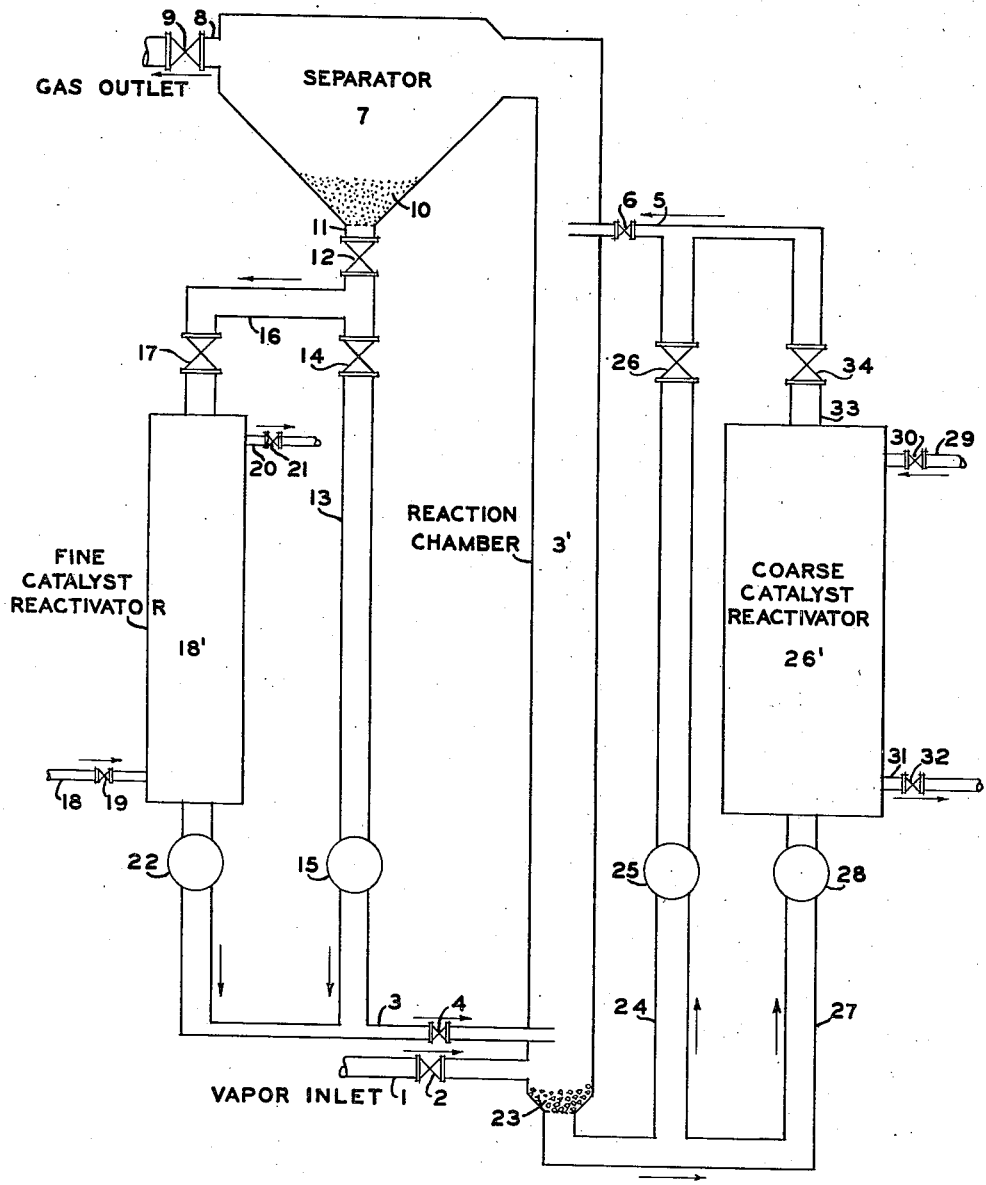

2,325,136

UNITED STATES PATENT OFFICE 2,325,136

PROCESS FOR EFFECTING CATALYZED REACTIONS

Louis S. Kassel, Chicago, Ill., assignor to Universal Oil Products Company, Chicago, Ill., a corporation of Delaware Application January 23, 1939, Serial No. 252,358

9 Claims. (Cl. 196—10)

This invention relates particularly to processes for catalyzing reactions occurring under substantially vapor phase conditions.

It is more specifically concerned with a method of catalyzing vapor phase reactions among organic compounds and particularly hydrocarbons which involves a considerable departure from the methods ordinarily employed in that instead of passing the vapors of reactants through stationary beds of granular catalytic materials, the vapors have in suspension finely divided powdered catalysts so that considerably more catalyst surface is exposed and the effectiveness of the catalyst is greatly increased.

The present process although applicable to any catalyzed vapor phase reaction is more particularly directed to catalyzed reactions among hydrocarbons such as the gaseous and liquid fractions of petroleum and also individual hydrocarbon compounds which are in general vaporizable under ordinary processing temperatures and pressures without material decomposition. Such reactions may include cracking relatively heavy fractions of petroleum to produce substantial yields of gasoline therefrom, reforming straight run or cracked gasolines of relatively low knock rating to improve them in this respect, polymerization reactions in which normally gaseous olefins are converted into normally liquid compounds, hydrogenation reactions of all types, both those of a destructive and a simple additive character, dehydrogenation reactions in which hydrogen is, for example, split off from a paraffin to produce the corresponding mono-olefin, and dehydrocyclization reactions in which further reactions than mono-molecular dehydrogenation occur involving removal of more hydrogen and the cyclization of unsaturated chain compounds to form ring compounds of a partially saturated or a completely aromatic character. The present process is especially adapted to equalizing the inaccuracy in time of exposure to catalytic influences which results from expansion or contraction of vapors undergoing reaction either by the production of new compounds or changes in temperatures due to the nature of the reactions themselves.

In the utilization of granular catalysts to accelerate organic reactions as practiced at the present time, it is found that there is more or less rapid deposition of carbonaceous materials on the catalyst particles so that their surfaces are contaminated, their activity falls off and reactivation is necessary, this being accomplished by various methods usually involving at some stage of reactivation the burning off of carbonaceous deposits with air or other oxidizing gas mixtures. As a rule, reactivations are practiced intermittently as a bed of catalyst contained in a reaction chamber falls below a certain activity. At such time the chamber is cut out from any series in which it may be a unit and the catalyst reactivated after which it is again led into the line of flow by proper manipulation of valves. As distinguished from these processes, the present process is substantially continuous in character.

In practice there are limitations to the size of catalyst particles which may be employed in any given reaction since the carbonaceous materials formed and deposited as a result of undesirable side reactions are frequently of a gummy or sticky character and in the case of extremely fine granules, a bed of catalyst tends to cohere and greatly increase resistance to flow of vapors therethrough to a point even higher than that primarily experienced with the finely divided catalyst. Thus, two factors operate, one in the direction of utilization of finely divided catalyst to attain maximum contact for a given weight of catalytic material and the other to limit the size of particles to reduce pressure drop through catalyst beds and eliminate the tendency of particles to stick together and cause channeling and increased resistance to flow. By utilization of the present process, many of the undesirable features inherent in the use of granular catalysts in organic reactions are substantially eliminated.

In one specific embodiment the present invention comprises a process for catalyzing substantially vapor phase reactions and particularly those occurring among organic compounds such as hydrocarbons which comprises simultaneously flowing relatively fine catalyst particles upwardly concurrent and relatively coarse catalyst particles downwardly counter-current to a rising stream of vapors undergoing reaction, separating reaction products from catalyst particles, separately reactivating said relatively fine and relatively coarse particles, and returning them to further use.

It will be seen from the foregoing general statement as to the type of process involved in the present invention that it has a wide applicability and that many types of apparatus can be employed in commercial practice. The particular design of such apparatus will depend upon many factors including the type of reaction, the catalyst used, the temperature, pressure and time of contact, which are found optimum for accomplishing best results, the amount of carbonaceous materials formed in the course of the reaction, the allowable temperature in reactivation when burning off such carbonaceous materials from the catalyst particles and various problems involving corrosion and the use of different types of metals.

The attached drawing has been provided to show diagrammatically and without regard to unessential details the type of process flow which characterizes the present invention. It is not suggested as a completely operable hook-up since the sizes of interconnected parts are drawn to no absolute or relative scale and the figures used are merely of a conventional character.

Referring to the drawing, vapors ready to undergo reaction in the presence of a catalyst are admitted through line 1, containing valve 2, to the bottom of reaction chamber 3' to pass upwardly therethrough. Finely divided reactivated catalyst particles are admitted from line 3, containing valve 4, the size of particles at this point being so adjusted that they are carried upwardly by the rising stream of vapors flowing at a predetermined rate for effecting the desired degree of reaction in a single pass through the reaction chamber. Simultaneously and countercurrently relatively coarser particles of such an average diameter that they will fall downwardly counter-current to the ascending stream of reacting vapors are admitted from line 5, containing valve 6. The relatively finer particles flowing upwardly are separated in chamber 7 while the reaction products pass through line 8, containing valve 9, to fractionation or collection. The settled catalyst dust shown at 10 passes downwardly through line 11, containing valve 12, and may be directly recycled until particles have been reduced in activity to an undesirable degree by way of line 13, containing valve 14, and a mechanical conveyor such as a blower or turbine 15. When the relatively finer particles require reactivation, they are by-passed through line 16, containing valve 17, through a reactivator 18' which may contain spaced baffles or shelves over which the catalyst particles pass downwardly counter-current to oxidizing gas mixtures introduced through line 18, containing valve 19, and vented through line 20, containing valve 21. In this case, 22 may represent the same type of motivator as indicated at 15.

Relatively coarse particles introduced from line 5 and falling downwardly through the reaction chamber 3 accumulate at the bottom of the reaction chamber at 23 and may be recycled directly to further use by way of line 24, containing conveying means 25 and valve 26, or subjected to reactivation in chamber 26', passing upwardly therethrough from line 27, containing some type of conveyor 28 countercurrent to oxidizing gas mixtures introduced for example into the top of reactivator from line 29, containing valve 30, and vented at the bottom of the reactivator through line 31, containing valve 32. The reactivated and relatively coarse particles then follow line 33, containing valve 34, and are readmitted to contact with the reacting vapors through line 5.

The foregoing description of the flow of relatively fine and relatively coarse catalyst particles omits many more or less necessary mechanical details with the object of showing the typical catalyst flow more clearly. The particle size of the two streams of catalyst must of course be such as to result in these counter-current movements. When the reaction takes place with an increase in volume, there will be a gap between the lightest particle that can fall down through the tube and the heaviest particle that can be carried up. Particles in this gap region will be immediately rejected at either end of the vertical reaction chamber, and hence will not be present in the chamber. Particles outside of the gap region are subjected to a continuous classification, and thus automatically kept in the proper stream. When the reaction takes place with a decrease in volume, particles in the gap region are accepted at either end of the reaction chamber and drawn to positions of equilibrium. Such particles are therefore particularly suitable in this case.

A catalyst inlet in the central part of the tube may be used either in place of, or in addition to, the two terminal inlets. Such an inlet when used alone represents a less perfect achievement of the object of this invention, which may, however, be sufficient for some purposes. When used in conjuncton with the terminal inlets, it is an almost ideal achievement of this purpose, probably better than most practical applications require.

In regard to some of the advantages of the present type of catalytic process, the case of reactions with an increase of volume will be considered first. If catalyst is charged at the top only, it will encounter less and less resistance as it falls through the tube, hence will go faster and faster. There will thus be a concentration gradient from top to bottom of the tube, which is more serious the closer the catalyst size approaches the minimum that can fall through the top part. Thus, in a reaction where the volume doubles, a particle with a free falling rate of three times the inlet gas linear velocity would decrease in concentration by 50% from top to bottom, and would pass through the tube with the same contact time as that of the gas. Heavier particles would have a smaller concentration gradient, but a still shorter contact time, requiring excessive recirculation. Furthermore, increase in temperature increases the volume increase due to reaction, hence decreases the catalyst rate of fall and increases its concentration, thus exaggerating the primary temperature effect. Increase in catalyst charging rate increases the catalyst concentration, both by primary and secondary effect. Increase in gas charging rate, which gives shorter contact time, is compensated by increase in catalyst concentration, but except for quite heavy catalyst particles is badly over-compensated.

If catalyst is charged only at the bottom of a vertical reaction chamber, similar troubles are encountered. The catalyst concentration decreases from bottom to top, the decrease being more serious the coarser the catalyst. Even for dust with zero settling velocity, a 100% volume increase during reaction means a 50% decrease in catalyst concentration from bottom to top. The operating characteristics are the reverse of those above, therefore desirable except with regard to variations in gas charging rate.

By combining both streams compensation of all these effects can be attained. Approximately uniform catalyst surface along the tube is accompanied by an integrated surface which is nearly independent of gas charging rate and shows only the expected primary dependence on temperature and catalyst charging rate.

When the reaction takes place with a volume decrease the single streams show the same types of unbalance, differing only in details, and the use of two streams again permits compensation.

The advantages of this invention do not depend only on comparison with the related single-stream systems but even more on comparisons with other methods. Many catalytic processes are successfully carried out with packed towers. But processes such as the catalytic dehydrogenation of paraffins to olefins or cyclo-dehydrogenation to aromatics, and catalytic cracking of gas-oil, in all of which the catalyst must be regenerated by burning at intervals of at most a few hours, and in some cases of only a few minutes, cannot easily be operated in such apparatus. Since these reactions are highly endothermic, the towers must be placed in an oven or furnace. The regeneration, however, is exothermic, and it is difficult or impossible to carry out the regeneration in a reasonable time without damaging the catalyst by overheating and the apparatus by stresses due to uneven expansion and contraction occurring when large solid bodies are too rapidly heated or cooled.

The following examples are given to indicate typical results obtainable in the practice of the invention in the general manner described in the foregoing specification without the intent of unduly limiting the scope of the invention.

The process was applied to the catalytic cracking of a Mid-Continent gas oil using a catalyst prepared by precipitating aluminum hydroxide on a specially prepared alkali-metal free silica gel followed by exhaustive washing, drying, calcining, and pulverizing. A reaction tube 20 feet high was employed and a space velocity of 4 volumes of liquid per hour was used at a minimum temperature of 510° C.

The mean molecular weight of the charge was about 280 and that of the products of cracking, approximately 140 so that the vapor volume doubled in going through the cracking zone. The gas velocity was approximately 4 feet per second at the top. The finely divided catalyst fed at the bottom had a free fall velocity of about 1.6 feet per second in still gas and those particles fed at the top, an average free fall velocity of 10.4 feet per second in still vapors. These velocities corresponded to average diameters (considering the particles as spherical) of approximately 0.0042 and 0.0106 inch, respectively. The weight charging rate of the large particles was about 6.5 times that of the lighter particles to give approximately the same catalyst surface exposure. The catalyst rates were therefore about 780 pounds per hour of coarse particles and about 120 pounds per hour of fine particles.

Under these conditions, the total catalyst surface per unit volume of reaction space had a relative value of 1 at the top, decreased gradually to about 0.80 at the center and increased to 1 again at the bottom. The range exhibited by either stream of particles separately would be comprised within the limits of 1 to 0.375.

Under the above approximately outlined conditions, 28% once-through yield of 78 octane number gasoline was obtained in a single pass and an amount of 3 and 4-carbon atom olefins, which when polymerized amounted to 4.5% by weight of the charge so that the blend represented a volume yield of 32.5%. By recycling unconverted intermediate fractions, the final yields of gasoline boiling range material including that produced by polymerization of the olefins mentioned was brought to 81% having an average octane number of 80.5 by the motor method.

The same approximate set-up in regard to dimensions of apparatus and sizes and flows of catalyst particles and vapors of reacting hydrocarbons was utilized in dehydrogenating a mixture of butanes using a catalyst consisting of approximately 80% by weight of activated alumina and 20% by weight of chromium sesquioxide. At a temperature of 575° C. in the reaction zone, an approximately equilibrium yield of 33% butenes was obtained with a minor amount of side reactions so that by recycling of unconverted butanes the final yield of butenes obtained was of the order of 80%. In applying the above-described process to the polymerization of normally gaseous olefins, a suitable catalyst is a precalcined mixture of finely divided silica and a phosphoric acid.

I claim as my invention:

1. In processes involving catalytic vapor phase reactions wherein a vaporous reactant is passed upwardly through a reaction zone in which the catalytic reaction is effected, the improvement which comprises circulating solid catalyst particles in a local cycle which includes said zone, said particles being of sufficient fineness to be carried upwardly with the ascending vaporous reactant; during the cyclic circulation of said particles, introducing the same to the lower portion of said zone for ascension with the reactant, withdrawing the ascended particles with reaction products from the upper portion of said zone and separating the same from reaction products for return to the lower portion of said zone; simultaneously circulating additional solid catalyst particles in a second cycle which also includes the reaction zone, said additional particles being of sufficient coarseness to descend through said zone counter-current to the rising vaporous reactant; and, during the cyclic circulation of said additional particles, introducing the same to the upper portion of said zone and withdrawing settled particles from the lower portion of the reaction zone for return to the upper portion thereof.

2. The process as defined in claim 1 further characterized in that catalyst particles are removed from each of said cycles, regenerated and returned to the respective cycles.

3. In processes involving catalytic vapor phase reactions wherein a vaporous reactant is passed upwardly through a reaction zone in which the catalytic reaction is effected, the improvement which comprises introducing to the lower portion of the reaction zone solid catalyst particles of sufficient fineness to be carried upwardly through said zone with the ascending vaporous reactant, and simultaneously introducing to the upper portion of the reaction zone solid catalyst particles of sufficient coarseness to descend through said zone countercurrent to the rising vaporous reactant.

4. The improvement as defined in claim 3 further characterized in that said reactant comprises hydrocarbon vapors.

5. The improvement as defined in claim 3 further characterized in that said reactant comprises hydrocarbon vapors which are cracked, with the aid of said catalyst particles, during their passage through the reaction zone.

6. A process for dehydrogenating hydrocarbons which comprises continuously and simultaneously flowing relatively fine catalyst particles upwardly concurrent and relatively coarse catalyst particles downwardly countercurrent to a rising stream of hydrocarbon vapors undergoing dehydrogenation, separating reaction products from catalyst particles, separately reactivating said relatively fine and said relatively coarse particles by contact with oxygen-containing gas, and separately returning fine and coarse particles to further use.

7. A process for dehydrogenating hydrocarbons in the presence of catalytic material comprising essentially a mixture of aluminum oxide and chromium sesquioxide which comprises continuously and simultaneously flowing relatively fine catalyst particles upwardly concurrent and relatively coarse catalyst particles downwardly countercurrent to a rising stream of hydrocarbon vapors undergoing dehydrogenation, separating reaction products from catalyst particles, separately reactivating said relatively fine and said relatively coarse particles by contact with oxygen-containing gas, and separately returning fine and coarse particles to further use.

8. A process for effecting the polymerization of normally gaseous olefin hydrocarbons which comprises continuously and simultaneously flowing relatively fine catalyst particles upwardly concurrent and relatively coarse catalyst particles downwardly countercurrent to a rising stream of said hydrocarbons, separating reaction products from catalyst particles, separately reactivating said relatively fine and said relatively coarse particles by contact with oxygen-containing gas, and separately returning fine and coarse particles to further use.

9. A process for effecting the polymerization of normally gaseous olefin hydrocarbons in the presence of catalytic material comprising essentially a precalcined mixture of finely divided silica and a phosphoric acid which comprises continuously and simultaneously flowing relatively fine catalyst particles upwardly concurrent and relatively coarse catalyst particles downwardly countercurrent to a rising stream of said hydrocarbons, separating reaction products from catalyst particles, separately reactivating said relatively fine and said relatively coarse particles by contact with oxygen-containing gas, and separately returning fine and coarse particles to further use.

LOUIS S. KASSEL.